Feb. 1, 1966  B. M. TESCHNER  3,232,094
AUTOMATIC AIR ANALYZER
Filed May 8, 1962
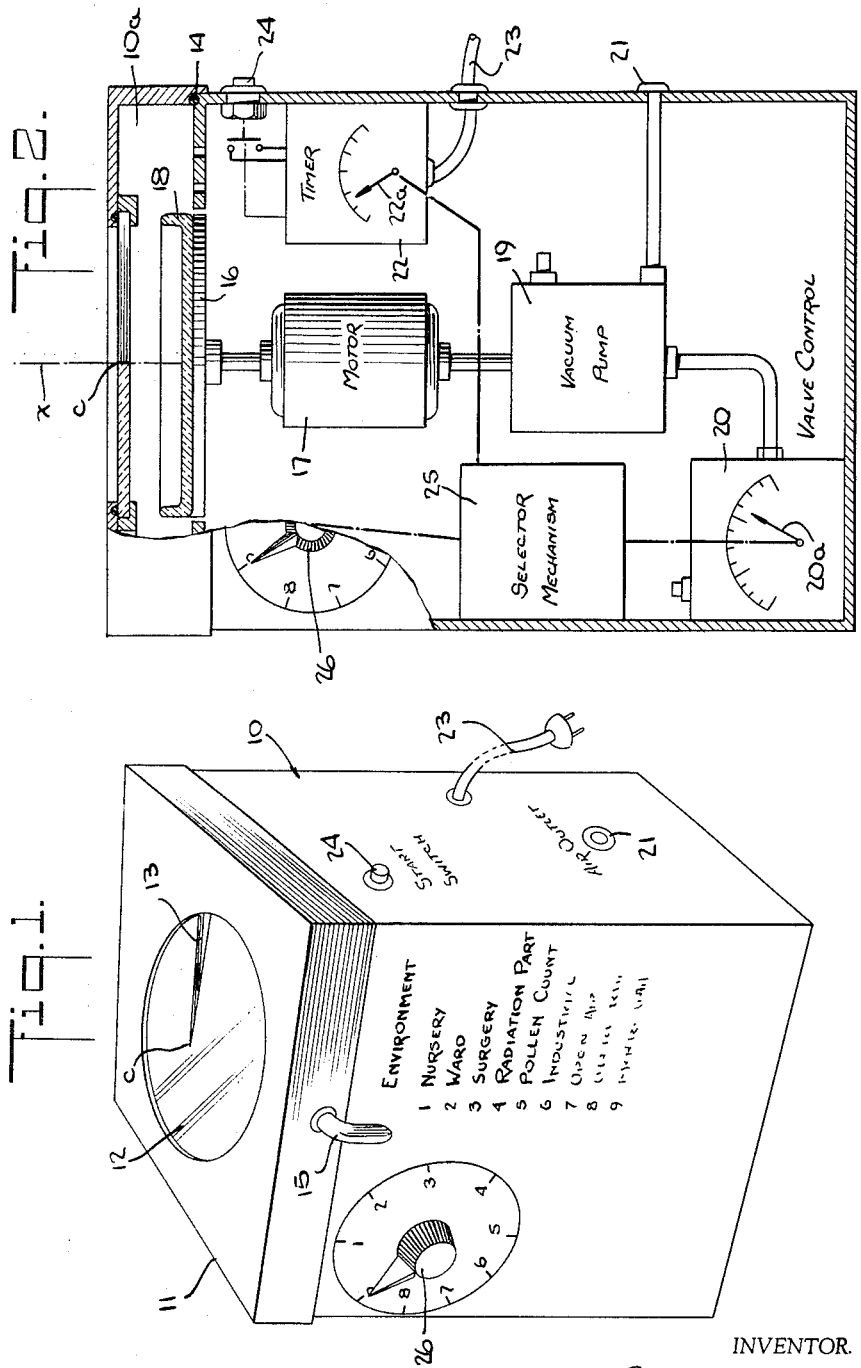
INVENTOR.
BERNARD M. TESCHNER
BY
ATTORNEY

United States Patent Office 3,232,094
Patented Feb. 1, 1966

3,232,094
AUTOMATIC AIR ANALYZER
Bernard M. Teschner, 255 Fort Hill Road,
Scarsdale, N.Y.
Filed May 8, 1962, Ser. No. 193,135
1 Claim. (Cl. 73—28)

This invention relates generally to techniques for analyzing air contamination, and more particularly to an instrument adapted to assay and monitor automatically the degree to which air in a given environment is subject to contamination by biological or radiological impurities, or by other forms of foreign matter.

There are many situations in which the degree of air purity is a matter of vital interest to those working or living in a given environment. Thus in industrial plants or in drug manufacturing facilities, it is often important that certain processes be carried out in a relatively pure atmosphere. It is necessary, therefore, to detect the presence of contaminants and to assay their magnitude. In hospitals having wards, nurseries and surgical rooms, a lookout must be maintained in each instance for the presence of deleterious contaminants. Another situation requiring air analysis is the presence of pollen, the count being significant to those who suffer from allergies. Radiological contamination is also currently of great concern.

Among the contaminants found in air are bacteria, fungi, viruses and pollens. Conventionally, the degree of such biological contamination is determined by exposing to the air a dish inoculated with a sensitive medium for a prescribed period of time. The dish is then studied directly or incubated in the case of bacteria and a count is taken of the collected particles or colonies. It is also known to expose an inoculated dish to a quantity of forced air drawn through a filter of predetermined size so that the particles deposited on the dish are screened in proportion to their size. A major drawback of these techniques is that the explosure period is relatively long, hence the test results are not available for at least a day. Where time is of the essence, as is often the case in surgical circumstances, this delay may have serious consequencies. Also, the exposed dish is unprotected and may become contaminated by contact, thereby giving rise to a misleading indication.

Accordingly it is the object of this invention to provide an instrument adapted automatically to test air contamination accurately and in a relatively short period.

More specifically, it is an object of the invention to provide an instrument of the above type, which is self-contained and portable, the instrument being readily moved from room to room in a hospital or in an industrial establishment requiring bacteriological air surveys.

A significant feature of the invention is that the entire surface of the collecting surface for contaminants is uniformly exposed throughout the test to a metered volume of air to provide accurate and reliable test results which are independent of variables arising from air gusts and other fluctuations encountered with conventional techniques.

Another object of the invention is to provide an instrument for testing air pollution by means of a dish which is placed in a protective enclosure to maintain sterility of the collected sample when bacteriological analyses are the primary concern.

Still another object of the invention is to provide an instrument capable of automatically metering the volume of sampled air and to perform interval analyses of any given air volume, the instrument being adapted to chart hour-by-hour or day-to-day fluctuations.

Also an object of the invention is to provide an automatic and portable instrument of the above-described type, which may be operated by unskilled personnel to collect samples of contaminants, the operator simply turning a control dial to a marked position appropriate to the environment being tested. Thus the operator in a hospital may take the instrument to a nursery, where he will set the dial to "Nursery" for sampling purposes, and later he may carry the same instrument to a surgery room, and this time turn the dial to "Surgery."

Briefly stated, these objects are attained by means of a tank with a removable cover having a circular window provided with a slit extending radially from a center point thereof to admit air into the tank. Mounted within the tank in axial alignment with said center point is a rotary turntable for supporting a sampling dish, the dish rotating relative to said slit. Also disposed within the tank is a vacuum pump which is controllable both as to flow rate and time of operation by an externally adjustable control mechanism, the pump acting to draw air into the tank through said slit and thereby cause air-borne particles to impact on the surface of the dish. The rotation of the dish relative to the slit provides a polar scanning action in which the entire surface of the dish is uniformly and continuously exposed to the inflowing air.

The control mechanism may be set selectively to any one of a plurality of positions to cause the pump to operate with a flow rate and for a period subjecting the dish to a predetermined volume of air, thereby providing an air exposure equivalent to a substantially greater period than in the case of a conventionally exposed dish.

Upon completion of the exposure, the dish is removed from the tank and the surface contents studied in the usual manner.

For a better understanding of the invention, as well as other objects and further features thereof, reference is made to the following detailed description to be read in conjunction with the accompanying drawing, wherein like components in the two views are identified by like reference numerals.

In the drawing:

FIG. 1 is a perspective view of an instrument in accordance with the invention; and FIG. 2 is a schematic diagram of the main components of the instrument.

Referring now to the drawing, and more particularly to FIG. 1, the instrument comprises a canister or tank 10, which may be of metal, plastic or any other material which may be readily cleaned, the tank being provided with a cover 11. Cover 11 includes a disc-shaped glass window 12 having a single radial slit 13 therein extending from the center of the window to the periphery thereof. The periphery of the window is hermetically sealed to the surrounding ledge of the cover whereby air is admitted only through the slit. The cover is preferably hinged to the tank and the mating edges of the cover and the tank are provided with rubber beading 14 or similar means, such that when the cover is locked, as by turning handle 15, an air-tight seal is effected. Thus the only air entering the closed tank is through the single slit 13.

Mounted within tank 10 is a horizontal turntable 16 which is driven at a constant speed by an electric motor 17 about an axis X in vertical alignment with the central point C from which the radial slit 13 extends. Receivable on turntable 16 within a sampling chamber 10a, is a circular sampling dish 18, and as the dish rotates, its entire surface is effectively scanned in a circular path by the radial slit 13. The sampling chamber 10a is defined by a partition which divides the area above the turntable in the tank from the area therebelow which contains the various components of the instrument. This partition is foraminated to permit the flow of air therethrough.

Motor 17 also drives a vacuum pump 19 of any standard and suitable construction, the inlet of the pump passing through a control valve 20 located within the tank. Valve 20 is adjustable as by means of control element 20*a* to vary the flow rate of the pump. The outlet 21 of the pump communicates with the tank exterior. Thus the pump draws air into the tank through slit 13 and expels the air through outlet 21.

Motor 17 is controlled through an adjustable timer 22 of any conventional electronic or electromechanical design, which is connected through line 23 to an electric power source. The operation of this timer is initiated by a start switch 24 mounted on the front panel of the tank, the motor working for a period determined by the setting of the timer. This setting is adjustable by means of a control element 22*a*.

In practice, switch 24 is preferably of the latching type, such that when momentarily depressed it remains closed until released by a reset signal derived from the timer at the end of the prescribed timing period. Switch 24 may include a second set of contacts connected in a pilot light circuit to indicate when the device is in operation.

In operation, when the motor is switched on, the turntable rotates the sampling dish and at the same time the pump draws in air through the slit, thereby subjecting the surface of the dish to impingement by particles in the inrushing air. These particles may be in the form of aerosols, that is, solid or liquid particles, suspended in air, and may vary in size from one to fifty microns. The suction of the pump causes the particles to impact and deposit on the dish surface.

The rate of air flow is controlled by the setting of valve 20, and the duration of flow by the setting of the timer 22. The volume of sampled air may therefore be accurately metered, for the volume is a function of the flow rate and flow time.

The solid surface on which the particles are collected may be dry or coated, or an agar surface, that is, one containing a food medium for the artificial cultivation of bacteria. Particles on the dry or coated surface may be counted immediately, whereas those on the agar surface must be first incubated for a prescribed period before the number of colonies grown thereon are counted. A qualitative study may be performed by reinoculating specific colonies into specific media. Thus when using an agar-coated dish, after exposure in the instrument, a lid is placed on the dish and it is put directly into an incubator.

Since the rate of air flow and the duration of flow is controllable, it is possible by the use of a selector mechanism 25 operated by a master dial 26 on the panel, to provide sampling volumes appropriate to different situations. Hence where a high degree of air purity is important, it may be desirable in the case of an atmosphere initially of good purity to determine whether the slightest trace of contamination exists. In other cases a smaller volume may be all that need be sampled. Each test condition therefore entails a different setting.

The single master dial acts to provide the desired settings of valve control 20 and timer 22 for each environmental condition. In FIG. 1, by way of example, the dial is calibrated for surgery, nursery, pollen count, etc. The dial arm is mechanically linked to selector mechanism 25 which may take the form of a stepping electromagnet responsive to the dial position to adjust both the timer and the valve to positions appropriate to the selected dial setting, so that for each dial position a different volume of air is introduced for sampling purposes when the start switch is depressed.

It becomes possible with this instrument to perform interval analyses of any given volume of air, and hour-to-hour fluctuations may easily be charted. Hour-to-hour or day-to-day radiological monitoring may be performed rapidly by making a quick quantitative sample and then qualitatively analyzing the impacted particles on a solid surface.

It is to be understood that the tank and the equipment therein constitutes a relatively small, self-contained and portable instrument which can be carried or otherwise moved from room to room in a hospital or industrial establishment and simply plugged into a power outlet. There are no exposed moving parts and the only operations necessary are (a) to lift the cover, (b) place the dish with proper collecting media on the turntable, (c) set the dial to the proper setting, and (d) press the start button. The dish cannot be disturbed once placed in the apparatus and sterility is thereby maintained.

In a simplified form of the instrument, one may dispense with the valve control for the pump, and simply use the timer to control the volume of incoming air to expose the dish. In this event, the volume is determined by a fixed flow rate and a duration of flow which is adjustable.

While preferred embodiments of the invention have been disclosed, it is to be understood that many changes and modifications may be made therein without departing from the essential spirit thereof as set forth in the annexed claim.

What is claimed is:

A claibrated air analyzer adapted to test a variety of environments, said analyzer comprising:

(a) a tank having a removable cover, said cover being provided with a radial slit extending from a center point, (b) a turntable mounted for rotation within said tank about an axis coincident with said point, (c) a vacuum pump disposed within said tank for drawing air through said slit, (d) a motor simultaneously driving said turntable and said pump at a constant speed whereby a dish placed on said turntable is uniformly and continuously subjected to air drawn through said slit by said pump, (e) adjustable means including a timer to energize said motor for an interval depending on the setting of the timer, (f) adjustable valve means to vary the flow rate of said pump in accordance with its setting, and (g) a control dial on the exterior of said tank to select one of said variety of environments, said dial being coupled both to said timer and said valve-adjusting means to produce at each setting of the dial a time setting and a valve-adjustment setting which causes said pump to draw in a predetermined volume of air which is appropriate to the selected environment.

References Cited by the Examiner

UNITED STATES PATENTS

| | | | |
|---|---|---|---|
| 1,396,568 | 11/1921 | Fuller | 73—28 |
| 2,076,553 | 4/1937 | Drinker et al. | 73—28 X |
| 2,484,202 | 10/1949 | Wintermute | 73—28 |

FOREIGN PATENTS

| | | |
|---|---|---|
| 679,024 | 9/1952 | Great Britain. |

OTHER REFERENCES

German application 1,032,574, June 1958.

RICHARD C. QUEISSER, *Primary Examiner.*